(12) United States Patent
Nitta

(10) Patent No.: US 9,290,226 B2
(45) Date of Patent: Mar. 22, 2016

(54) OIL PASSAGE STRUCTURE FOR ELECTRIC VEHICLE

(75) Inventor: Takahiro Nitta, Kobe (JP)

(73) Assignee: Kawasaki Jukogyo Kabushiki Kaisha, Kobe-shi (KP)

( * ) Notice: Subject to any disclaimer, the term of this patent is extended or adjusted under 35 U.S.C. 154(b) by 370 days.

(21) Appl. No.: 13/976,424

(22) PCT Filed: Dec. 24, 2011

(86) PCT No.: PCT/JP2011/007242
§ 371 (c)(1),
(2), (4) Date: Jun. 26, 2013

(87) PCT Pub. No.: WO2012/090463
PCT Pub. Date: Jul. 5, 2012

(65) Prior Publication Data
US 2013/0270038 A1    Oct. 17, 2013

(30) Foreign Application Priority Data
Dec. 27, 2010    (JP) .................... PCT/JP2010/007580

(51) Int. Cl.
*F16N 7/38*    (2006.01)
*B62K 11/00*    (2006.01)
(Continued)

(52) U.S. Cl.
CPC .............. *B62K 11/00* (2013.01); *B62K 11/04* (2013.01); *B62K 19/30* (2013.01); *B62M 7/02* (2013.01); *F16N 7/38* (2013.01); *B62K 2204/00* (2013.01)

(58) Field of Classification Search
CPC ........ B62K 11/00; B62K 11/04; B62K 19/30; B62K 2204/00; B62M 7/07; F16N 7/38

USPC ............................................................ 184/6
See application file for complete search history.

(56) References Cited

U.S. PATENT DOCUMENTS

| 4,531,485 A | * | 7/1985 | Murther .................. F01M 1/16 123/196 R |
| 4,895,182 A | * | 1/1990 | Gerl ........................ F16N 7/38 137/596.12 |

(Continued)

FOREIGN PATENT DOCUMENTS

| CN | 101492087 A | 7/2009 |
| CN | 201357926 Y | 12/2009 |

(Continued)

OTHER PUBLICATIONS

European Patent Office, Extended European Search Report of EP10861285, Apr. 17, 2014, Germany, 7 pages.

(Continued)

*Primary Examiner* — William A Rivera
*Assistant Examiner* — Michael Riegelman
(74) *Attorney, Agent, or Firm* — Alleman Hall McCoy Russell & Tuttle LLP

(57) ABSTRACT

A straddle electric vehicle (e.g., electric motorcycle) comprising a driving motor and an electric power control unit for controlling electric power supplied from batteries to the driving motor, a case of the electric power control unit is mounted to the battery box from outward, and electrode terminals protruding outward from the case are inserted into insertion holes of the battery box. The electrode terminals protruding into inside of the battery box are connected to electrodes of the batteries via electric conductors such as bus bars. In this structure, electric connecting work between the batteries and the electric power control unit can be easily carried out, high-voltage lines can be minimized in length, and the high-voltage lines are not exposed to outside.

6 Claims, 7 Drawing Sheets

(51) Int. Cl.
  *B62K 11/04*  (2006.01)
  *B62M 7/02*  (2006.01)
  *B62K 19/30*  (2006.01)

(56) References Cited

U.S. PATENT DOCUMENTS

| | | | | |
|---|---|---|---|---|
| 5,111,090 | A * | 5/1992 | Otake | H02K 9/19 180/229 |
| 5,501,292 | A * | 3/1996 | Kawashima | B62K 25/283 180/220 |
| 5,657,830 | A | 8/1997 | Kawashima et al. | |
| 6,739,305 | B2 * | 5/2004 | Takahara | F01M 1/02 123/196 R |
| 6,903,471 | B2 * | 6/2005 | Arimitsu | B60K 6/445 310/113 |
| 6,941,922 | B2 * | 9/2005 | Williams | F01M 1/02 123/196 R |
| 7,395,803 | B2 * | 7/2008 | Ledger | B60K 6/445 123/196 R |
| 8,556,021 | B2 * | 10/2013 | Nomura | B60K 6/40 180/219 |
| 2013/0153338 | A1 * | 6/2013 | Yamauchi | F01M 1/02 184/26 |
| 2013/0220721 | A1 * | 8/2013 | Matsuda | B62K 11/04 180/220 |
| 2013/0229072 | A1 * | 9/2013 | Matsuda | B62K 11/04 310/53 |

FOREIGN PATENT DOCUMENTS

| | | |
|---|---|---|
| CN | 201400282 Y | 2/2010 |
| EP | 1414134 A2 | 4/2004 |
| JP | 4151386 A | 5/1992 |
| JP | 05065085 A | 3/1993 |
| JP | 2001155749 A | 6/2001 |
| JP | 2007182833 A | 7/2007 |
| JP | 2009132252 A | 6/2009 |
| JP | 2009227130 A | 10/2009 |
| JP | 2009248828 A | 10/2009 |
| JP | 2009292184 A | 12/2009 |
| JP | 2010018270 A | 1/2010 |

OTHER PUBLICATIONS

United States Patent and Trademark Office, Office Action Issued in U.S. Appl. No. 13/976,453, Dec. 31, 2013, 12 pages.
United States Patent and Trademark Office, Office Action Issued in U.S. Appl. No. 13/976,453, Jul. 9, 2014, 10 pages.
United States Patent and Trademark Office, Office Action Issued in U.S. Appl. No. 13/976,453, Nov. 13, 2014, 10 pages.
ISA Japanese Patent Office, International Search Report Issued in Application No. PCT/JP2010/007580, Apr. 12, 2011, WIPO, 2 pages.
European Patent Office, Extended European Search Report Issued in Application No. 11852569.0, Jun. 22, 2015, Germany, 6 pages.
Japanese Patent Office, International Search Report of PCT/JP2011/007242, Mar. 27, 2012, WIPO, 2 pages.

* cited by examiner

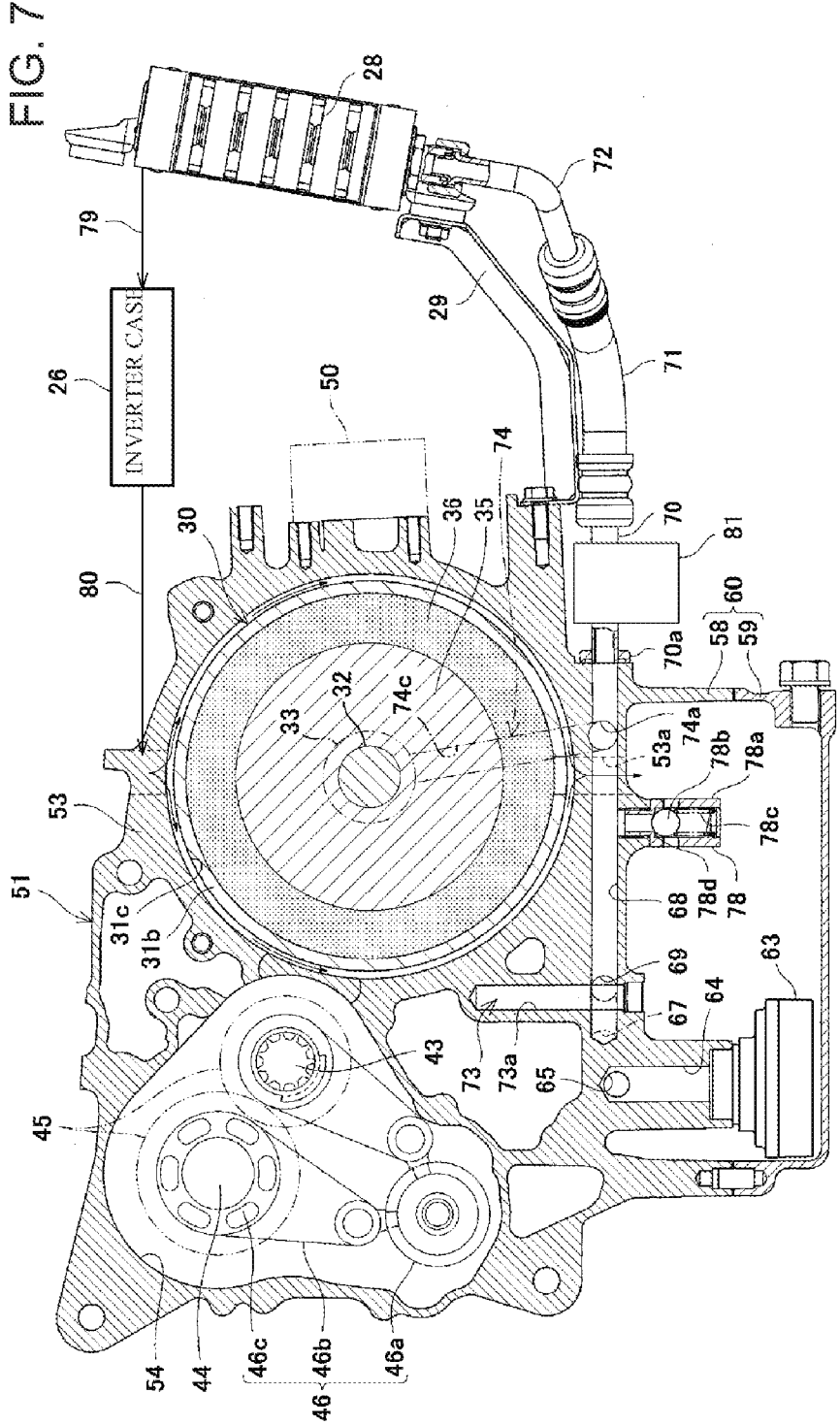

OIL PASSAGE STRUCTURE FOR ELECTRIC VEHICLE

TECHNICAL FIELD

The present invention relates to an electric vehicle which includes an electric motorcycle or an ATV (All Terrain Vehicle: a rough terrain driving vehicle) using an electric motor as a drive source and further includes a hybrid vehicle in which an engine is also installed. More particularly, the present invention relates to an oil passage structure for lubricating a drive system.

BACKGROUND ART

Conventionally, an engine and a transmission are integrally provided in a saddle type vehicle, such as a motorcycle, and the vehicle is configured to utilize engine oil for lubricating a speed change gear train. For example, an engine for a motorcycle described in Patent Document 1 includes an oil pump mechanically driven by a crankshaft. The oil discharged from this oil pump passes through an oil filter and an oil cooler, and thereafter, is fed to a main passage within a crankcase. Then, while being fed from the main passage to a valve operating system, a piston, a crank journal, and the like of the engine, the oil is also supplied to a transmission through a transmission side oil passage.

PRIOR ART DOCUMENT

Patent Document

Patent Document 1: Japanese Patent Application Laid-open No. 2007-182833

SUMMARY OF THE INVENTION

Problems to be Solved by the Invention

In a case of the oil pump which is mechanically driven by the crankshaft of the engine as described above, when a number of revolutions of an engine is low, a number of revolutions of a pump also becomes low. Thus, it is possible that a discharge rate or discharge pressure of oil is insufficient in an extremely low speed range including idling. In this respect, because an output torque of the engine is generally also small in the extremely low speed range, a load applied to a transmission gear or the like becomes also small. Accordingly, a problem hardly occurs even if the pressure of oil supplied to the transmission gear or the like is low.

On the contrary, in a case of an electric vehicle, an electric traction motor generates the maximum torque in a very low speed range including the time of starting a vehicle. Accordingly, when the pressure of oil supplied to the transmission gear or the like is low at this time, lubrication may become inadequate and durability can be decreased. In the conventional example, the oil discharged from the oil pump passes through the oil filter and the oil cooler, and thereafter, is fed to the engine and the lubricated portion of the transmission. Consequently, in particular, the large pressure loss in the oil cooler becomes a problem.

On the other hand, in the electric vehicle, when the oil is utilized for cooling the electric motor and an electric drive circuit (e.g., an inverter) thereof, the oil cooler is essential to lower the temperature of the oil. However, among the electric vehicles, the motorcycle has a small space for mounting equipment. It is necessary to take a special measure to secure a space for mounting the oil cooler in addition to the problem of pressure loss.

In consideration of these points, an object of the present invention is to appropriately distribute and supply oil from an oil supply source to a lubricated portion and a cooled portion upon each request thereof in a case where lubrication of a traction drive system and cooling of an electric motor or an electric drive circuit are carried out by common oil in an electric vehicle.

Solutions to the Problems

In order to achieve the above-described object, the present invention is directed to an oil passage structure for an electric vehicle which supplies lubrication oil to an electric traction motor of an electric vehicle and a power transmission mechanism for transmitting an output of the electric motor to a wheel, including: a main passage connected to an oil supply source; a first oil passage which guides oil from the main passage to an oil cooler; and a second oil passage which branches from the main passage and supplies oil to at least the power transmission mechanism.

In the above-described structure, because the second oil passage is branched from the main passage before the oil cooler, the oil having a relatively high pressure and no pressure loss in the oil cooler can be supplied to at least the lubricated portion, such as a transmission gear or bearings, of the power transmission mechanism, i.e., the transmission. Moreover, the amount of oil guided to the oil cooler becomes small as a result and the oil cooler has a relatively small capacity. Thus, a space for mounting the oil cooler can be easily secured.

The second oil passage branches from the main passage and supplies oil to a transmission component of the power transmission mechanism, and the oil passage for an electric vehicle may further include a third oil passage which branches from the main passage on the downstream side of the flow of oil than the second oil passage and supplies oil to bearings of an output shaft of the electric motor.

Namely, the passage for supplying oil to the transmission component, such as the transmission gear or the like, generally has a complicated structure and the pressure loss therein is likely to be large. Accordingly, in order to secure the oil pressure supplied to the transmission component, the second oil passage is branched from the main passage on the upstream side, i.e., the side which is closer to the oil supply source.

Further, the oil passage structure for an electric vehicle may further include a fourth oil passage which supplies oil from the oil cooler to at least one of the electric motor and an electric drive circuit thereof (an inverter and the like). By so doing, the oil cooled by the oil cooler can effectively cool the electric motor, the inverter, or the like.

On the other hand, the oil passage structure for an electric vehicle may include an electric oil pump as the oil supply source in addition to a mechanical oil pump mechanically driven by the electric traction motor. By so doing, at the time of starting a vehicle when the electric traction motor is stopped or at the time of extremely low speed when the number of revolutions of the electric motor is very low, even if the discharge rate or discharge pressure of the mechanical oil pump is insufficient, such insufficiency can be complemented by the operation of the electric oil pump.

In this case, a communication passage communicating from a discharge port of the electric oil pump to the main passage may be connected to a portion of the main passage branched into the second oil passage. By so doing, the oil discharged from the electric oil pump is quickly supplied to the second oil passage and the oil pressure supplied to the transmission gear or the like can be quickly increased.

Further, it is preferable that an oil filter for filtering oil is provided at the first oil passage or at the main passage on a downstream side of the flow of oil than the portion of the main passage branched into the second oil passage. By so doing, the pressure is not lost at the oil filter and the oil having a higher pressure can be supplied to the transmission gear or the like.

Effects of the Invention

In accordance with the present invention, oil can be appropriately provided to the lubricated portion of the traction drive system, such as the power transmission mechanism, of the electric vehicle or the cooled portion, such as the electric motor or the inverter, upon each request thereof. Namely, while the oil pressure requested is supplied to the lubricated portion of the drive system and the low temperature oil requested is supplied to the cooled portion, such as the inverter, the capacity of the oil cooler can be reduced and the space for mounting the oil cooler in the vehicle is easily secured.

BRIEF DESCRIPTION OF THE DRAWINGS

FIG. 7 is a view corresponding to FIG. 3 relating to another embodiment in which an oil filter is provided at a front portion of a case member of a motor unit.

EMBODIMENTS OF THE INVENTION

Figure 1:
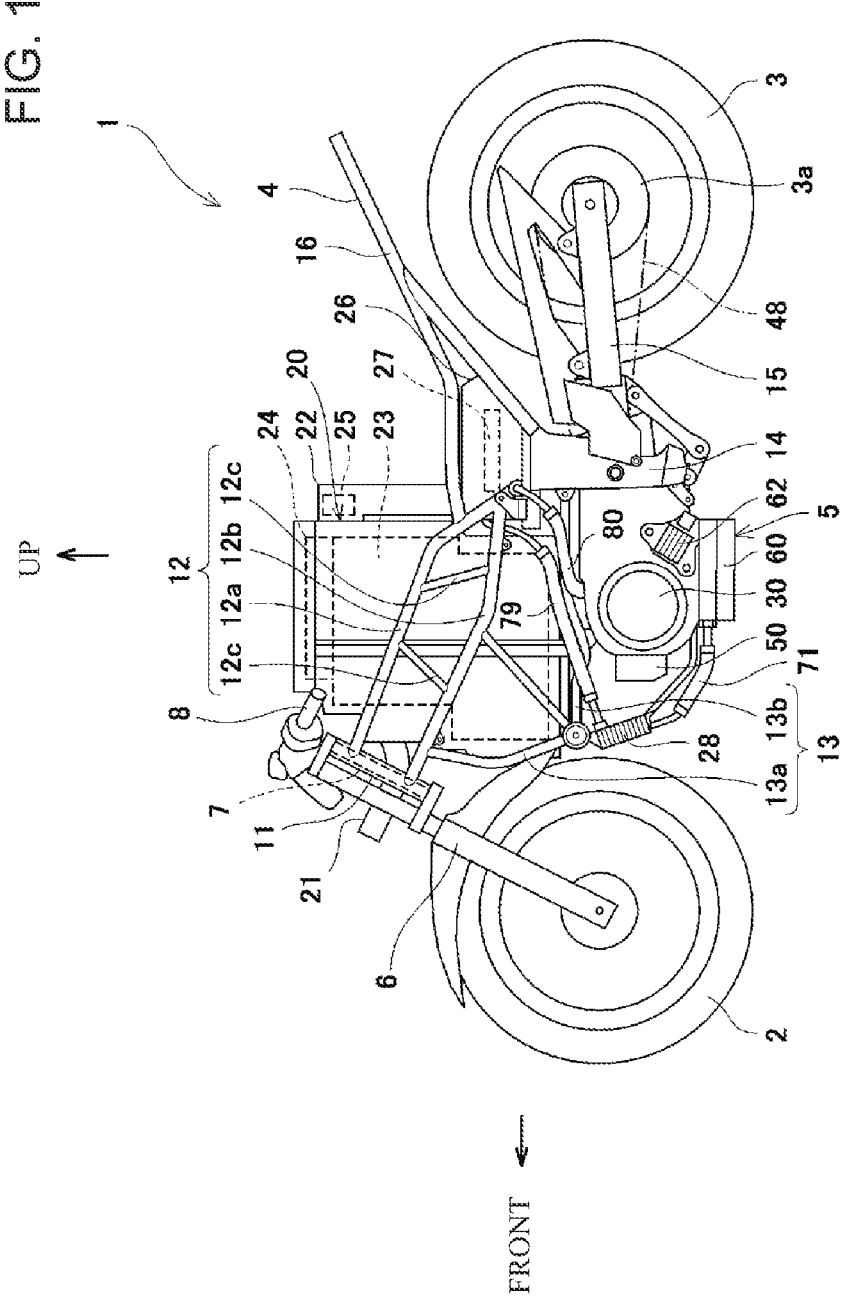
FIG. 1 is a left side view of an electric motorcycle which is an example of an electric vehicle relating to an embodiment of the present invention.

Referring to the accompanying drawings, an embodiment of the present invention will be described below. The concept of front, rear, left, and right directions used in the following description is based on the direction viewed by a driver riding on an electric motorcycle relating to the present embodiment. In the following description, like reference numerals are used to designate identical or corresponding components in all drawings and a redundant detailed description thereof is omitted.

(Overall Structure of Electric Motorcycle)

FIG. 1 is a left side view of an electric motorcycle 1 which illustrates as an example of an electric vehicle according to an embodiment of the present invention. As illustrated in FIG. 1, the electric motorcycle 1 includes a front wheel 2 which is a driven wheel, a rear wheel 3 which is a driving wheel, a body frame 4 which is disposed between the front wheel 2 and the rear wheel 3, and a motor unit 5 which is supported at the body frame 4. This electric motorcycle 1 does not have an engine and is structured so as to rotary drive the rear wheel 3 by a traction power generated by an electric traction motor 30 (referred "traction motor 30" hereinafter).

The front wheel 2 is rotatably supported at a lower portion of a front fork 6 which extends in the substantially upward and downward direction, inclining at a certain caster angle. A steering shaft 7 is connected to an upper portion of the front fork 6 and a bar type steering wheel 8 is mounted to an upper portion of the steering shaft 7. A right grip of the steering wheel 8 is an accelerator grip (not shown) for adjusting the traction power generated by the electric motor 30.

The body frame 4 has a head pipe 11, a pair of left and right and a pair of up and down main frames 12, a pair of left and right down frames 13, a pair of left and right pivot frames 14, a pair of left and right swing arms 15, and a seat frame 16. The head pipe 11 rotatably supports the steering shaft 7.

The main frame 12 has a pair of left and right upper main frame portions 12a, a pair of left and right lower main frame portions 12b, and truss frame portions 12c connecting the upper main frame portion 12a to the lower main frame portion 12b. The upper main frame portion 12a extends substantially parallel to the lower main frame portion 12b. The upper main frame portion 12a and the lower main frame portion 12b extend rearward from the head pipe 11, inclining in the slightly downward direction. The upper main frame portion 12a bends substantially downward at a rear end thereof and joins with the lower main frame portion 12b. The truss frame portions 12c connect the upper main frame portion 12a to the lower main frame portion 12b in front of the junction. In this way, rigidity of the entire main frame 12 can be increased.

The down frame 13 has a vertical frame portion 13a which extends substantially downward as seen from the head pipe 11 and a lower frame portion 13b which extends from a lower end of the vertical frame portion 13a in the substantially horizontal and rearward direction. The pivot frame 14 is connected to a rear end of the main frame 12 and a rear end of the lower frame portion 13b. The swing arm 15 extends in the substantially forward and rearward direction, a front end thereof is swingably connected to the pivot frame 14, and a rear end thereof rotatably supports the rear wheel 3. The seat frame 16 extends rearward from the rear end of the upper main frame portion 12a and the upper end portion of the pivot frame 14, inclining in the slightly upward direction. The seat frame 16 supports seats (not illustrated) allowing a driver and a fellow passenger to sit front and rear in a row.

Although not illustrated, a driver who rides on the seat holds grips of the steering wheel 8 with both hands, bends both legs so as to place both feet on steps (not shown), and grips a rear and upper portion of a battery case member 20 positioned immediately in front of the seat with both knees ("Knee Grip"). Thus, in order to facilitate the "Knee Grip", a dimension of the rear and upper portion of the battery case member 20 in the rightward and leftward direction is set smaller than the dimension of a lower portion thereof.

The battery case member 20 is disposed between the left and right main frames 12 so as to be surrounded thereby and a lower surface of the battery case member 20 is positioned slightly above the lower frame portion 13b. The battery case member 20 is disposed so as not to overlap the pair of left and right main frames 12 with a planar view and respective left and right wall portions are fastened to the main frames 12 by bolts or the like. Accordingly, the battery case member 20 can be inserted between the main frames 12 from the upper or lower side thereof and mounted to the body frame 4.

An air intake duct 21 is connected to a front surface of the battery case member 20 so as to extend forward. On the other hand, an air exhaust duct 22 is connected to an upper portion of a rear surface of the battery case member 20 so as to extend downward. By providing these ducts 21 and 22, running wind from the front is taken into the air intake duct 21, and a battery unit 23 and an electric component 24 of the battery case member 20 can be air-cooled effectively.

Since an air intake port provided at a front end of the air intake duct 21 protrudes farther forward than the front fork 6 as viewed from the side, rainwater or mud splashed by the wheels 2 and 3 can be prevented from entering the air intake duct 21. Further, an air exhaust fan 25 for exhausting air within the battery case member 20 is disposed in the vicinity of an upper end of the air exhaust duct 22, thereby reducing a possibility that rainwater or the like enters the battery case member 20 through the air exhaust duct 22.

Moreover, behind a lower portion of the battery case member 20, an inverter case member 26 is provided at a substantially triangular space surrounded by the main frame 12, the pivot frame 14, and the seat frame 16, as viewed from the side. An inverter 27, to which a power semiconductor, such as an IGBT (Insulated-Gate Bipolar Transistor), is mounted, is accommodated within this inverter case member 26 and is connected to the battery unit 23 in the battery case member 20 by an unillustrated power line or the like.

Additionally, the motor unit 5 as described above is disposed in a space which is below the battery case member 20, i.e., below the down frame 13, and in front of the pivot frame 14. As will be described below in detail, the fraction motor 30 is accommodated within a front portion of the motor unit 5 and a transmission 40 (power transmission mechanism) is accommodated within a rear portion thereof. While the left and right sides of the rear portion of the motor unit 5 are respectively fastened to the pivot frames 14, the left and right sides of the front portion of the motor unit 5 are respectively fastened to the lower frame portions 13b of the down frame 13.

Further, a terminal board 50 of the power line is provided at the front portion of the motor unit 5 so as to protrude forward and an oil cooler 28 is provided separately at the front of the terminal board 50. An upper portion of the oil cooler 28 is mounted to a front end of the lower frame portion 13b and a lower portion of the oil cooler 28 is supported at a front portion of the motor unit 5 through a stay 29 (see FIG. 3). The oil cooler 28 cools oil which is used to lubricate and cool the motor unit 5 or the like by heat exchange with running wind.

Namely, as will be described below in detail with reference to FIGS. 3 through 6, an oil pan 60 is provided at the lower portion of the motor unit 5, and the oil stored therein is sucked up by an electric oil pump 62 or the like and supplied to lubricate bearings 33 of a motor shaft 32 of the traction motor 30, a gear train 45 of the transmission 40, or the like. Further, a part of the oil is fed to the oil cooler 28 through a lower hose 71 and is heat-exchanged with running wind passing through the oil cooler 28.

Thus, the cooled and temperature lowered oil is fed to the inverter case member 26 through an upper hose 79 which is connected to the upper portion of the oil cooler 28. An unillustrated cooler having a labyrinth-shaped oil passage is incorporated into the inverter case member 26 so as to contact the inverter 27. The oil, which removed heat from the inverter 27 while circulating in this cooler, is returned to the motor unit 5 through a return hose 80. As will be described below, the oil cools the traction motor 30 and then flows down to the oil pan 60 in the motor unit 5.

In the present embodiment, it should be noted that the traction motor 30 is a motor generator which enables a motor operation and a power generating operation and that the motor is operated by electricity supplied by the battery 24 through the inverter 27 and outputs a driving force to the rear wheel 3. On the other hand, the traction motor 30 operates as a generator at the time of a regenerative braking of the electric motorcycle 1, and an alternating current generated is converted into a direct current by the inverter 27 and stored in the battery 24. The control relating to the operation of the traction motor 30 or the charge-discharge control of the battery 24 is carried out by conventionally known methods.

—Structure of Motor Unit—

Figure 2:
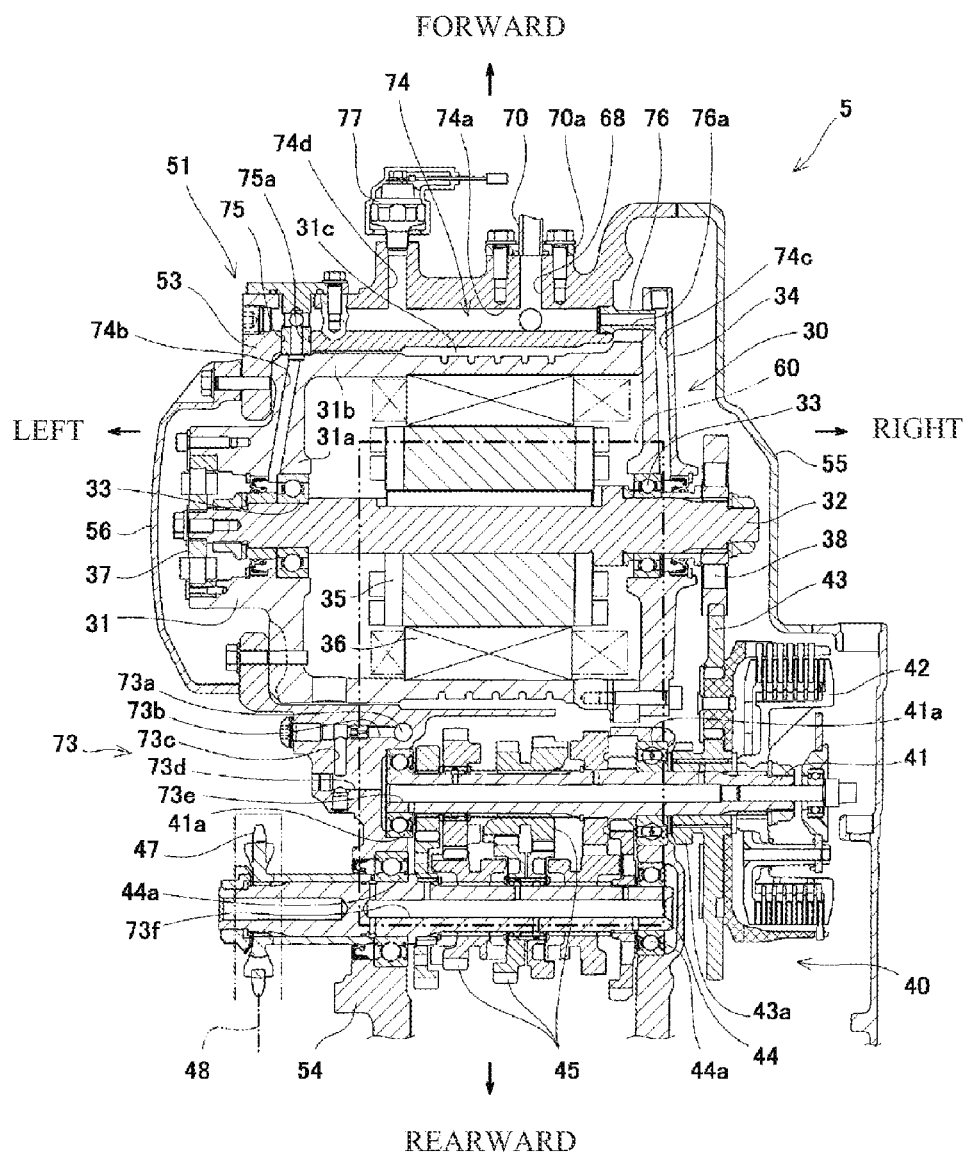
FIG. 2 is a developed view showing a schematic structure of a traction motor and a transmission of a motor unit.
Figure 3:
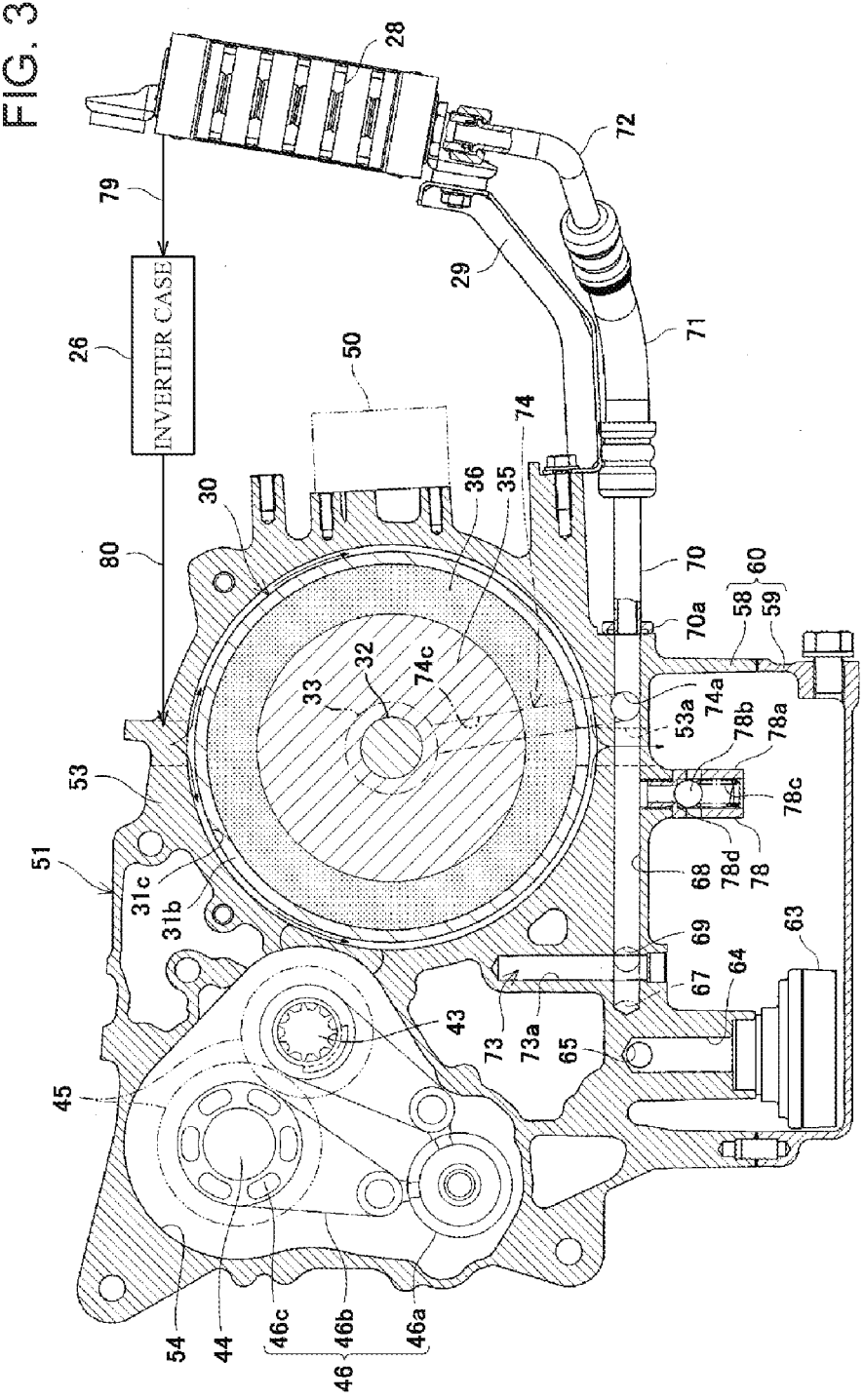
FIG. 3 is a cross-sectional view showing mainly a structure of an oil passage, as seen from a right side of the motor unit.

FIG. 2 is a developed view showing schematically a structure of the traction motor 30 and the transmission 40 in the motor unit 5. FIG. 3 is a cross-sectional view of the motor unit 5 showing a structure of an oil supply system, as seen from a right side of the electric motorcycle 1. As depicted in FIG. 2, a motor accommodating portion 53 and a transmission accommodating portion 54 (transmission mechanism accommodating portion), which open toward the right, are respectively provided front and rear in a row at a case member 51 of the motor unit 5. A separate right wall member 55 is mounted to the case member 51 so as to close right openings of the motor accommodating portion 53 and the transmission accommodating portion 54.

Schematically the motor accommodating portion 53 has a bottom and is formed in a cylindrical shape. A cylindrical case member 31 of the traction motor 30 is accommodated from the right opening of the motor accommodating portion 53 in a mounted state, and a motor shaft 32 (output shaft) extends along a cylindrical shaft of the case member 31 in the left and right direction. The motor shaft 32 is supported by a bearing 33 (bearing of the output shaft) at both left and right sides. The left bearing 33 is inserted through a through-hole of a bottom wall portion 31a provided at a left end of the motor case member 31, and the right bearing 33 is inserted through a through-hole of a cap 34 which closes the opening of a right end of the motor case member 31.

By so doing, the pair of bearings 33 are respectively provided at the bottom wall portion 31a and the cap 34, which are wall portions of the cylindrical motor case member 31 at the cylindrical shaft direction both ends. Between the bearings 33, a rotor 35 is mounted to the motor shaft 32 so as to integrally rotate therewith. Although not illustrated, a permanent magnet is embedded into an iron core of the rotor 35 and an annular stator 36 is disposed adjacent to this rotor 35 so as to surround an outer circumference thereof. It should be noted that a cooling jacket 31c is formed at a gap between a peripheral wall portion 31b of the motor case member 31 and the motor accommodating portion 53 so as to surround the stator 36 (to be described below).

A left end of the motor shaft 32 penetrates through the bottom wall portion 31a of the motor case member 31 and protrudes to the left. A rotation angle sensor 37 is provided at a tip of the motor shaft 32. In the present embodiment, a boss portion protrudes from the bottom wall portion 31a of the motor case member 31 so as to surround a left end of the motor shaft 32 which penetrates therethrough. A pickup portion of the rotation angle sensor 37 is disposed at this boss portion. Additionally, a lid member 56 is mounted to the left end of the motor accommodating portion 53 so as to cover the rotation angle sensor 37.

On the other hand, a right end of the motor shaft 32 penetrates through the cap 34 and protrudes to the right. An output gear 38 is mounted to a tip of the motor shaft 32 by a spline or the like. As illustrated also in FIG. 2, a clutch shaft 41, which is an input shaft of the transmission 40, is disposed at the rear of the traction motor 30. A clutch gear 43, which is externally mounted near a right end of this clutch shaft 41 so as to be rotatable, engages with the output gear 38 of the motor shaft 32. The clutch gear 43 is connected to an adjacent multiple disk clutch 42 (not illustrated in FIG. 3). Since the clutch gear 43 and the clutch shaft 41 are connected by this multiple disk clutch 42, a rotation from the motor shaft 32 is transmitted to the clutch shaft 41.

Further, an output shaft 44 of the transmission 40 is provided at the rear of the clutch shaft 41 and the both shafts are connected via the gear train 45 so as to change gears freely. Namely, as shown only in FIG. 3, a combination of gears connected at the gear train 45 is changed by a transmission operating mechanism 46 formed by a shift drum 46a, a shift fork 46b, a dog clutch 46c, and the like. In this way, a speed change ratio of an input/output rotation, i.e., a gear position of the transmission 40, is changed.

As shown in FIG. 2, a sprocket 47 is provided at a left end of the output shaft 44, from which such gear changed rotation is output. As shown only in FIG. 1, a chain 48 (depicted in an imaginary line) is wound around the sprocket 47 and a sprocket 3a of the rear wheel 3. It should be noted that the power transmission mechanism which transmits a driving force of the traction motor 30 is not limited to the multiple-position type transmission 40 as described above. The power transmission mechanism may be, for example, a belt type continuously variable transmission or a simple deceleration mechanism having a constant speed change ratio.

As illustrated in FIG. 2, the width of the transmission accommodating portion 54, which accommodates the transmission 40 as mentioned above, is narrower than the width of the motor accommodating portion 53 in the left and right direction. The rectangular oil pan 60 having a relatively narrow width is provided at a lower portion of the case member 51 of the motor unit 5 so as to roughly correspond to the width of this transmission accommodating portion 54 (depicted in an imaginary line in FIG. 2). The oil pan 60 is formed in a rectangular shape which is long in the forward and rearward direction in such a way that a rear portion thereof is positioned below the transmission accommodating portion 54 and a front portion thereof is positioned below the motor accommodating portion 53. The rotor 35 and the stator 36 of the traction motor 30 are disposed further to the right relative to the center of the motor accommodating portion 53 in the left and right directions in such a way that the rotor 35 and the stator 36 are included within the range of the oil pan 60 in the left and right direction.

—Oil Supply System of Motor Unit—

Figure 4:
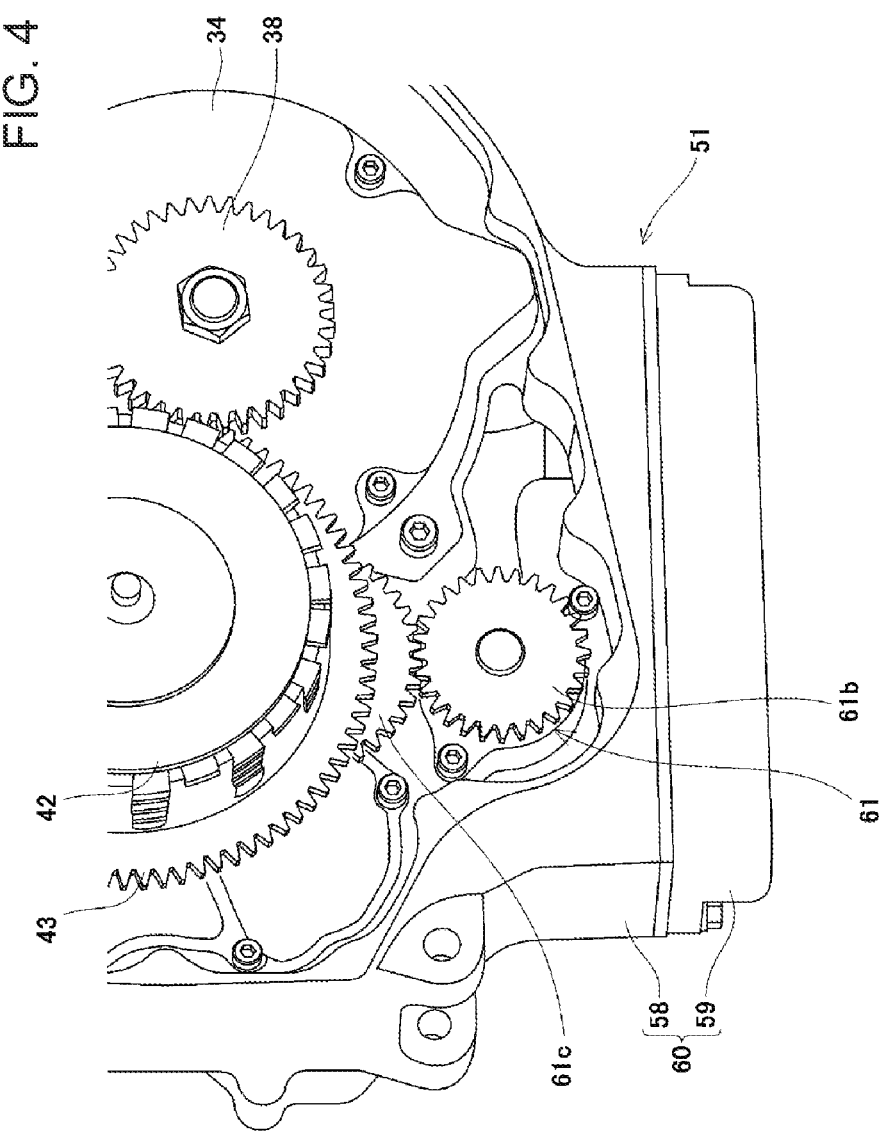
FIG. 4 is a perspective view showing a mechanical oil pump, as seen from the right side of the motor unit.
Figure 5:
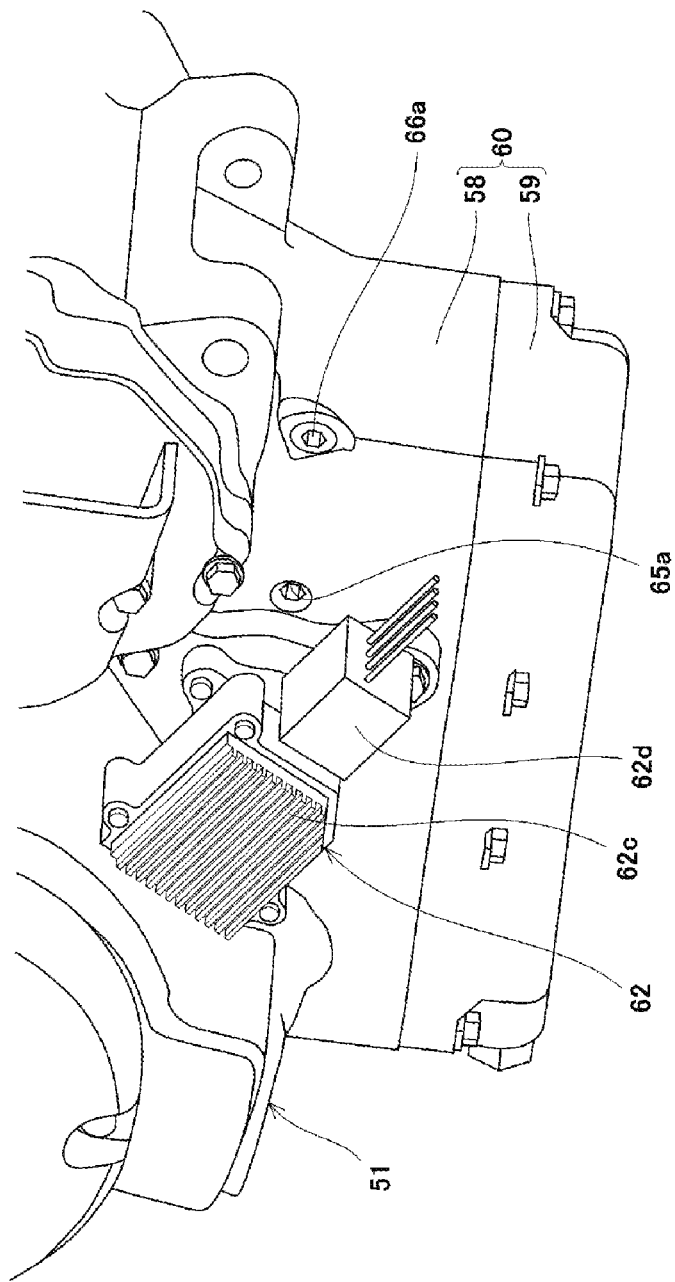
FIG. 5 is a perspective view showing an electric oil pump, as seen from the left side of the motor unit.

Next, referring to FIG. 3 and also FIGS. 4 through 6, an oil supply system for lubricating and cooling the motor unit 5 will be described. FIG. 4 shows a mechanical oil pump 61 driven by the traction motor 30, as seen from the right side as in FIG. 3. FIG. 5 shows the electric oil pump 62, in which a dedicated electric motor (not shown) is built, as seen from the left side. Moreover, FIG. 6 shows a structure of an oil passage, to which the two oil pumps 61 and 62 are connected.

Figure 6:
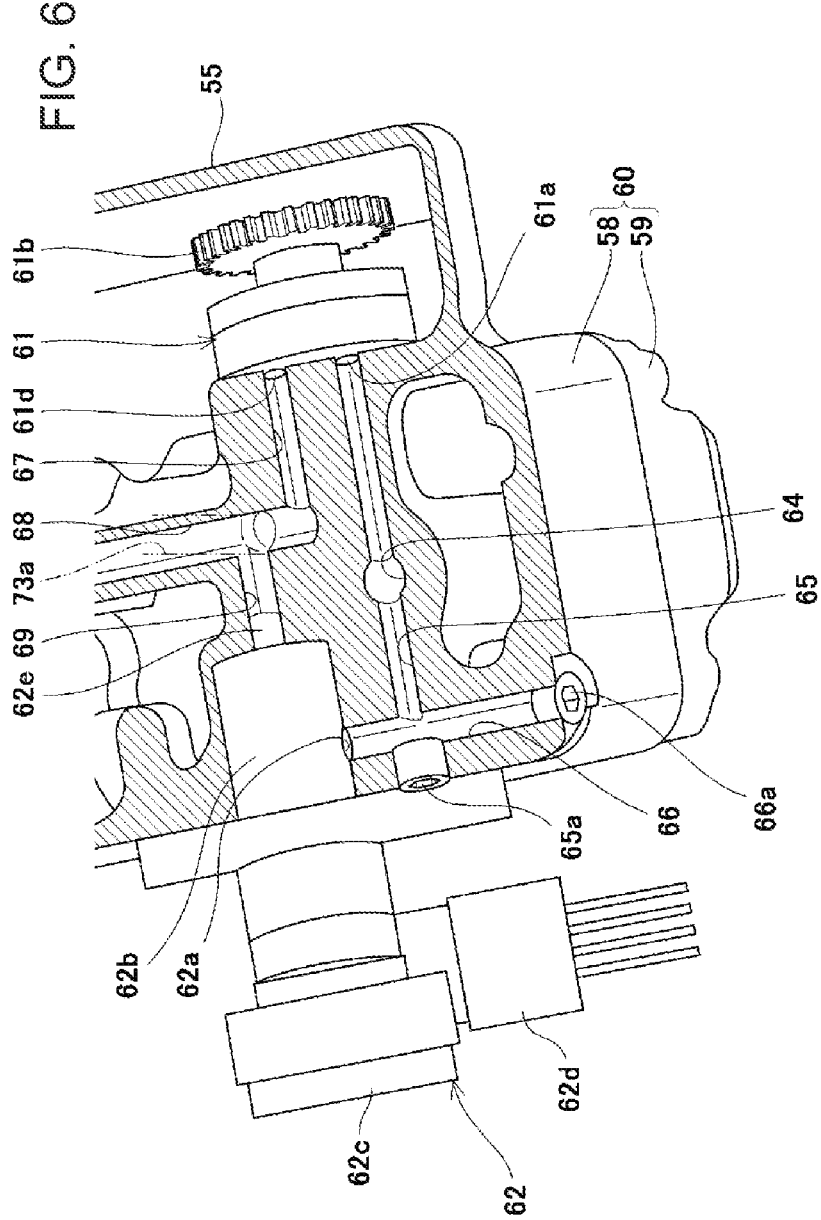
FIG. 6 is a perspective view showing, in cross section, a portion of the structure of the oil passage to which the two oil pumps are connected.

As illustrated in FIGS. 3 and 6, a rectangular oil pan portion 58 is formed at the bottom of the case member 51 of the motor unit 5 so as to extend downward and a separate oil pan main body 59 is mounted to the bottom of the oil pan portion 58, thereby constituting the oil pan 60. The oil flowed down from the motor accommodating portion 53 or the transmission accommodating portion 54 on the upper side is stored in the oil pan 60. As mentioned above, the oil pan 60 is a cuboid which is long in the forward and rearward direction and extends from the motor accommodating portion 53 to the transmission accommodating portion 54. Protrusion of the oil pan 60 to the lower side of the motor unit 5 is prevented with a necessary capacity secured.

The motor unit 5 in the present embodiment includes the mechanical oil pump 61 and the electric oil pump 62 as oil supply sources. The pumps 61 and 62 suck up the oil stored in the oil pan 60 through a common strainer 63 and discharge, respectively. Namely, as an example, the strainer 63 is disposed near the rear of the oil pan 60 so as to be immersed in the stored oil, and a lower end of a first suction oil passage 64 which extends in the upward and downward direction is connected to an upper end of the strainer 63.

As illustrated in FIG. 6, an upper end of the first suction oil passage 64 communicates with a second suction oil passage 65 which extends substantially horizontally to the left and right. While a right end of this second suction oil passage 65 is connected to a suction port 61a of the mechanical oil pump 61, a left end of the second suction oil passage 65 is connected to a suction port 62a of the electric oil pump 62 through a third suction oil passage 66 which extends in the forward and rearward direction. In other words, the mechanical oil pump 61 and the electric oil pump 62 are disposed so as to oppose each other in the leftward and rightward directions, and the oil suction ports 61a, 62a of these pumps 61, 62 are connected to the common oil passage (the first suction oil passage 64).

It should be noted that, as an example, the second suction oil passage 65 is formed by a drill hole drilled into the case member 51 of the motor unit 5 from the left side surface to the right side and that a left end thereof is closed by a plug 65a. Further, the third suction oil passage 66 is formed by a drill hole drilled into the case member 51 from the rear surface to the front. While a front end of the third suction oil passage 66 is connected to the suction port of the electric oil pump 62, a rear end thereof is closed by a plug 66a.

As illustrated in FIG. 4, when the right wall member 55 is removed and the interior of the case member 51 of the motor unit 5 is viewed, the mechanical oil pump 61 is disposed on the lower side of the transmission accommodating portion 54 and a pump driving gear 61c engaging with a driven gear 61b is engaged with a small diameter gear 43a (see FIG. 2) which is integrally provided with the clutch gear 43. In the present embodiment, the mechanical oil pump 61 is, for example, a trochoid pump and a discharge rate thereof increases in proportion to an increase in the number of revolutions of the traction motor 30. As an example, while the discharge rate of oil is set to be sufficient from a medium to high revolution range of the traction motor 30, the discharge rate of oil is set to be insufficient in a low revolution range thereof.

On the other hand, in the electric oil pump 62 shown in FIG. 5, a flange portion is fastened on a left side surface of the case member 51 of the motor unit 5. As shown in FIG. 6, a cylindrical main body portion 62b is accommodated within a recessed portion of a left side wall of the case member 51. An electric motor (not illustrated) is built in the main body portion 62b and operates in response to a control order from an unillustrated controller. A heat sink 62c is mounted to a left end of the main body portion 62b and a connector 62d for a signal line which connects the main body portion 62b and the controller is provided diagonally rearward thereof.

Unlike the mechanical oil pump 61, the number of revolutions of the electric oil pump 62 can be controlled regardless of the number of revolutions of the traction motor 30. Accordingly, as an example, when the electric motorcycle 1 is in an extremely low speed range (e.g., a speed range of less than 10 km/h), the number of revolutions of the fraction motor 30 is low, and the discharge rate or the discharge pressure of oil from the mechanical oil pump 61 is not sufficient, it is preferable that the electric oil pump 62 is operated so as to complement such an insufficiency.

As illustrated in FIG. 6, an oil discharge port 61d of the mechanical oil pump 61 is communicated with a main oil passage 68 (main passage) through a first discharge oil passage 67 (communication passage). Likewise, an oil discharge port 62e of the electric oil pump 62 is communicated with the main oil passage 68 through a second discharge oil passage 69. The main oil passage 68 is a drill hole drilled into the case member 51 from the front surface to the rear and the first discharge oil passage 67 communicates with a rear end thereof from the right side. Also, the second discharge oil passage 69 communicates with the main oil passage 68 slightly in front of an area where the main oil passage 68 communicates with the first discharge oil passage 67, that is, on the downstream side of the flow of oil.

On the other hand, a rear end of a metal pipe member 70 communicates with a front end of the main oil passage 68 opening on the front surface of the case member 51. While the rear end of this metal pipe member 70 is mounted to the front surface of the case member 51 by a joint 70a, a front end of the pipe member 70 is connected to a rear end of the lower hose 71 in a vicinity of a rear end of the stay 29 which supports a lower portion of the oil cooler 28. The lower hose 71 is, for example, a hose having elasticity, such as rubber. The lower hose 71 extends roughly forward, is bent diagonally to the right, and thereafter is connected to the lower portion of the oil cooler 28 via a metal pipe member 72.

A first oil passage which guides oil from the main oil passage 68 to the oil cooler 28 is configured by these pipe members 70, 72 and the lower hose 71. In the present embodiment, a transmission side oil passage 73 (second oil passage) and a motor side oil passage 74 (third oil passage) are formed in the case member 51 of the motor unit 5. The transmission side oil passage 73 branches from the main oil passage 68 and supplies oil for lubricating the gear train 45 or the like of the transmission 40, and the motor side oil passage 74 similarly branches from the main oil passage 68 and supplies oil for lubricating the bearings 33 of the traction motor 30.

The transmission side oil passage 73 has a first transmission side oil passage 73a which branches from the main oil passage 68 and extends upward and a second transmission side oil passage 73b which communicates with an upper end of the first transmission side oil passage 73a. A lower end of the first transmission side oil passage 73a communicates with the main oil passage 68 at an area where the second discharge oil passage 69 from the electric oil pump 62 communicates therewith. As shown only in FIG. 2, the second transmission side oil passage 73b extends to the left from an area where the second transmission side oil passage 73b communicates with the first transmission side oil passage 73a. Thereafter, a third transmission side oil passage 73c extends in the forward and rearward direction, a fourth transmission side oil passage 73d extends in the leftward and rightward directions, and a fifth transmission side oil passage 73e extends within the clutch shaft 41 in the shaft center direction. Then, oil is supplied to the gear train 45 or the bearing 41a from this fifth transmission side oil passage 73e through a plurality of orifices which extend outward in the radial direction.

Further, the first transmission side oil passage 73a also communicates with a sixth transmission side oil passage 73f within the output shaft 44 of the transmission 40 through an unillustrated oil passage. Oil is supplied from the sixth transmission side oil passage 73f which extends within the output shaft 44 in the shaft center direction to the gear train 45 or the bearing 44a through a plurality of orifices which extend outward in the radial direction. In this way, the transmission side oil passage 73 which supplies oil to the gear train 45 or the bearings 41a, 44a has a relatively complicated structure and is likely to have a large pressure loss.

On the other hand, the motor side oil passage 74 branches from the main oil passage 68 at a lower side of the motor accommodating portion 53, i.e., in a forward area of the case member 51 of the motor unit 5 (a downstream side of the flow of oil than the transmission side oil passage 73). The motor side oil passage 74 has a first motor side oil passage 74a which extends in the leftward and rightward direction and a second motor side oil passage 74b and a third motor side oil passage 74c which respectively extend toward the motor shaft 32 of the traction motor 30.

Namely, as illustrated in a solid line in FIG. 2 and an imaginary line in FIG. 3, the second motor side oil passage 74b is formed at the bottom wall portion 31a of the motor case member 31, and the third motor side oil passage 74c is formed at the cap 34 thereof. While inner peripheral ends of the second and third motor side oil passages 74b, 74c are connected so as to supply oil to the bearings 33, an outer peripheral end of the second motor side oil passage 74b communicates with a left end of the first motor side oil passage 74a via a port 75a formed at a joint member 75, and an outer peripheral end of the third motor side oil passage 74c communicates with a right end thereof via a port 76a formed at a joint member 76.

As shown only in FIG. 2, it should be noted that a hydraulic sensor 77 is connected to the first motor side oil passage 74a through a branch passage 74d and that an output signal of the hydraulic sensor 77 is input to the controller. The pressure of oil at the first motor side oil passage 74a is generally the same as the pressure of oil supplied to the bearings 33 of the traction motor 30. By detecting this pressure value and controlling the operation of the electric oil pump 62, a state where necessary oil is supplied to the portions of the motor unit 5 can be maintained.

As shown only in FIG. 3, a relief valve 78 is provided between the transmission side oil passage 73 and the motor side oil passage 74 which respectively branch from the main oil passage 68. A ball 78b accommodated within a cylindrical housing 78a is normally pressed against an upper seat portion 78d by the urging force of a coil spring 78c, and thus the relief valve 78 is in a closed state. Then, when a hydraulic pressure of the main oil passage 68 is increased to a predetermined value or more, the ball 78b which received this hydraulic pressure moves downward, press-shrinking the coil spring 78c. The ball 78b is then separated from the seat portion 78d. The relief valve 78 is in an opened state which opens the hydraulic pressure of the main oil passage 68.

As mentioned above referring to FIG. 1, in the present embodiment, the stator 36 of the traction motor 30 and the inverter 27 which produce heat during the operation are cooled by utilizing the oil used to lubricate the traction motor 30 or the transmission 40 as described above. Namely, a part of the oil flowing through the main oil passage 68 is fed to the oil cooler 28 via the pipe members 70, 72 and the lower hose 71, is heat-exchanged with running wind, and is cooled while rising through a core of this oil cooler 28.

As typically shown in FIG. 3, the upper hose 79 is bridged from an upper portion of the oil cooler 28 to the inverter case member 26 which is located behind the oil cooler 28, and the return hose 80 is bridged from the inverter case member 26 to the motor unit 5 (see also FIG. 1). A lower end of the return hose 80 is connected to an upper portion of the case member 51 of the motor unit 5 via an unillustrated joint or the like. The oil which cooled the inverter 27 is returned to the interior of the case member 51 of the motor unit 5 by the return hose 80.

Here, as mentioned above, the motor unit 5 of the present embodiment has the double-walled structure where the motor case member 31 is mounted to the motor accommodating portion 53 of the case member 51. By utilizing this structure, a cooling jacket 31c is formed at a gap between the motor accommodating portion 53 and the peripheral wall portion 31b of the motor case member 31 so as to surround the stator 36. In other words, a shallow groove portion having a rectangular cross section is formed from a substantially central portion of the outer periphery of the peripheral wall portion 31b of the motor case 31 to a slightly right side over the entire periphery thereof. At the same time, a thin-walled portion is formed at an inner peripheral surface of the motor accommodating portion 53 which surrounds the motor case 31. The annular cooling jacket 31c is thereby formed between the shallow groove portion and the thin-walled portion.

As shown only in FIG. 2, a plurality of narrow annular deep groove portions (five in the example shown in FIG. 2) are formed at a shallow groove portion, facing the cooling jacket 31c, on the peripheral wall portion 31b side of the motor case 31. The cooling efficiency of the stator 36 by the oil is thereby increased. Then, as described above, the oil which flows down through the return hose 80 flows into the cooling jacket 31c from above. As indicated by arrows in FIG. 3, the oil is separated in the circumferential direction and flows along the outer circumference of the motor case 31. In this way, the oil which removed heat from the traction motor 30 while flowing down the cooling jacket 31c drops from the oil discharge portion 53a at the lower portion of the motor accommodating portion 53 into the oil pan 60 below.

—Operation Of Oil Supply System—

In the motor unit 5 having the above structure, when a main switch of the electric motorcycle 1 is turned on, first, the electric oil pump 62 operates in response to a control order from the controller and feeds oil to the main oil passage 68. This oil is fed from the main oil passage 68 to the oil cooler 28 through the lower hose 71, is fed to the inverter case member 26 through the upper hose 79, and is returned to the motor unit 5 through the return hose 80. While the motorcycle 1 is in park, the traction motor 30 stops and heat generation of the inverter 27 is small. Accordingly, the number of revolutions of the electric oil pump 62 is controlled and extremely low and wasteful electricity consumption is minimized.

Moreover, a part of the oil fed to the main oil passage 68 flows through the transmission side oil passage 73 and is supplied to the transmission 40, thereby lubricating the gear train 45 or the bearings 41a and 44a. Similarly, the oil flowed from the main oil passage 68 to the motor side oil passage 74 is supplied to the traction motor 30 and lubricates the bearings 33. When a driver operates the accelerator grip in this state, the traction motor 30 starts to rotate according to the amount of operation and the electric motorcycle 1 starts to move. The traction motor 30 generates a relatively large torque at the time of starting. However, since the oil has been already supplied to the lubricated portions of the traction motor 30 and the transmission 40, running out of oil does not become a problem.

Then, the mechanical oil pump 61 operates together with the rotation of the traction motor 30 and begins to discharge oil. The discharge rate and the discharge pressure of the oil of the mechanical oil pump 61 is likely to be insufficient in the extremely low speed range of less than a predetermined vehicle speed (e.g., 10 km/h) including at the time of starting. Thus, the operation of the electric oil pump 62 continues. The oil discharged from the two oil pumps 61, 62 is fed from the main oil passage 68 to the oil cooler 28 through the lower hose 71. The oil which is heat-exchanged with running wind and has a lowered temperature is then fed to the inverter case member 26 and returned to the motor unit 5, as described above.

Namely, the oil cooled at the oil cooler 28 is fed to the inverter case member 26 so as to cool the inverter 27. Thereafter, the oil is returned to the motor unit 5 to cool the traction motor 30. Since relatively large electric current flows into the traction motor 30 when the electric motorcycle 1 starts to move, heat generation of the inverter 27 and the traction motor 30 increases. However, these can be cooled effectively by the relatively low temperature oil cooled at the oil cooler 28, as described above.

Further, the oil flowed from the main oil passage 68 to the transmission side oil passage 73 and the motor side oil passage 74 respectively lubricates the gear train 45 or the bearings 41a and 44a and the bearings 33 of the traction motor 30. Both the transmission side oil passage 73 and the motor side oil passage 74 branch from the main oil passage 68 and there is no pressure loss of oil in the oil cooler 28. Therefore, high-pressure oil can be supplied to the lubricated portions of the transmission 40 and the traction motor 30.

In particular, considering that the transmission side oil passage 73 which supplies oil to the gear train 45 or the like of the transmission 40 has a relatively complicated structure and a pressure loss thereof is likely to be large, in the present embodiment, the transmission side oil passage 73 is branched from the main oil passage 68 on the upstream side of the flow of oil than the motor side oil passage 74, i.e., near the oil pumps 61 and 62. By so doing, it is easy to secure a necessary oil pressure at the transmission side oil passage 73 which is likely to have a large pressure loss. Additionally, the second discharge oil passage 69 from the electric oil pump 62 is communicated with the portion of the main oil passage 68 branched into the transmission side oil passage 73. Accordingly, the oil from the electric oil pump 62 is quickly supplied to the transmission side oil passage 73 and the pressure of oil supplied to the transmission 40 can be quickly raised.

It should be noted that if a running speed of the electric motorcycle 1 becomes high, the number of revolutions of the mechanical oil pump 61 becomes high with the increase in the number of revolutions of the traction motor 30, and the discharge rate and discharge pressure of the oil increases. Thus, the operation of the electric oil pump 62 is stopped.

Therefore, in accordance with the oil passage structure of the electric vehicle (electric motorcycle 1) according to the present embodiment, first, overall weight gain or cost rises of the oil supply system can be controlled by utilizing the lubrication oil of the motor unit 5 for cooling the inverter 27 or the traction motor 30. Further, appropriate oil can be supplied as required in such a way that the oil having a sufficient pressure is supplied to the lubricated portion of the traction drive system, such as the gear train 45 of the transmission 40, and the oil cooled at the oil cooler 28 is supplied to the cooled portions, such as the inverter 27 and the traction motor 30.

Furthermore, because the flow rate of oil fed to the oil cooler 28 is smaller as a result, the capacity of the oil cooler 28 can be relatively small and a space for mounting the oil cooler 28 can be easily secured even in the electric motorcycle 1.

—Other Embodiments—

Description of the above-described embodiment is merely an example and does not limit the present invention, applications thereof, or uses thereof. For example, in the above-described embodiment, the motor unit 5 includes the mechanical oil pump 61 and the electric oil pump 62 as oil supply sources. However, the motor unit 5 may only include, for example, the mechanical oil pump 61. Moreover, even when the motor unit 5 includes both the mechanical oil pump 61 and the electric oil pump 62, it is not necessary to communicate the second discharge oil passage 69 from the electric oil pump 62 with the portion of the main oil passage 68 branched into the transmission side oil passage 73 as in the above-described embodiment.

In addition, in the above-described embodiment, the transmission side oil passage 73 is branched from the main oil passage 68 on the relatively upstream side and the motor side oil passage 74 is branched therefrom on the relatively downstream side. However, this may be the other way around. Alternatively, the transmission side oil passage 73 and the motor side oil passage 74 may be branched from the same area of the main oil passage 68, or the transmission side oil passage 73 and the motor side oil passage 74 may be further branched from an oil passage which is branched from the main oil passage 68.

Furthermore, a position of the oil filter is not explained in the above-described embodiment. Considering the pressure loss, it is preferable that the oil filter is also provided at the main oil passage 68 or the like on the downstream side than the areas into which the transmission side oil passage 73 and the motor side oil passage 74 are branched. As shown in FIG. 7 as an example, an oil filter 81 may be integrally provided with the pipe member 70 between the main oil passage 68 and the lower hose 71. In this way, maintenance, such as replacement of a filter element, can be easily carried out.

The electric motorcycle 1 is described in the above-described embodiment. However, the electric vehicle according to the present invention is not limited to a motorcycle and may be, for example, an ATV (All Terrain Vehicle: a rough terrain driving vehicle), a mechanical mule, or the like. Further, it goes without saying that the present invention includes not only the traction motor 30 but also a hybrid electric vehicle equipped with an engine as a drive source.

Industrial Applicability

As mentioned above, the oil passage structure of an electric vehicle according to the present invention can appropriately provide oil to the lubricated portion of the fraction drive system and the cooled portions, such as the electric motor and the inverter, upon each request thereof, and further can reduce the capacity of the oil cooler. Therefore, it is particularly beneficial for the electric vehicle having a small mounting space for components.

REFERENCE CHARACTERS LIST

1: Electric motorcycle (electric vehicle)
5: Motor unit
30: Traction motor (electric traction motor)
40: Transmission (power transmission mechanism)
61: Mechanical oil pump (oil supply source)
62: Electric oil pump (oil supply source)
68: Main oil passage (main passage)
69: Second discharge oil passage (communication passage)
70, 72: Pipe member (first oil passage)
71: Lower hose (first oil passage)
73: Transmission side oil passage (second oil passage)
74: Motor side oil passage (third oil passage)
79: Upper hose (fourth oil passage)

The invention claimed is:

1. An oil passage structure for an electric vehicle which supplies lubrication oil to an electric traction motor of the electric vehicle and to a power transmission mechanism for transmitting an output of the electric motor to a wheel, including:
   a main passage connected to an oil supply source;
   a first oil passage which guides oil from the main passage to an oil cooler; and
   a second oil passage which branches from the main passage before the oil cooler and supplies the oil to at least the power transmission mechanism, the second oil passage being different from the first oil passage,
   wherein the oil is supplied from the oil cooler to at least one of the electric motor and an electric drive circuit of the electric motor.

2. The oil passage structure according to claim 1, wherein the second oil passage branches from the main passage and supplies oil to a transmission component of the power transmission mechanism, and further including:
   a third oil passage which branches from the main passage at a location downstream of the second oil passage in an oil flow direction and supplies oil to bearings of an output shaft of the electric motor.

3. The oil passage structure according to claim 1, further including a fourth oil passage which supplies oil from the oil cooler to at least one of the electric motor and an electric drive circuit thereof.

4. The oil passage structure according to claim 1, wherein the oil supply source includes a mechanical oil pump mechanically driven by the electric traction motor and an electric oil pump.

5. The oil passage structure for according to claim 4, wherein a communication passage communicating with a discharge port of the electric oil pump is connected to a portion of the main passage branched into the second oil passage.

6. The oil passage structure according to claim 1, wherein an oil filter is provided at the first oil passage or at the main passage at a location downstream of the portion of the main passage branched into the second oil passage in an oil flow direction.

* * * * *